Feb. 23, 1954  G. R. RASMUSSEN  2,669,968
ANIMAL OPERATED STOCK OILER
Filed July 31, 1951  2 Sheets-Sheet 2
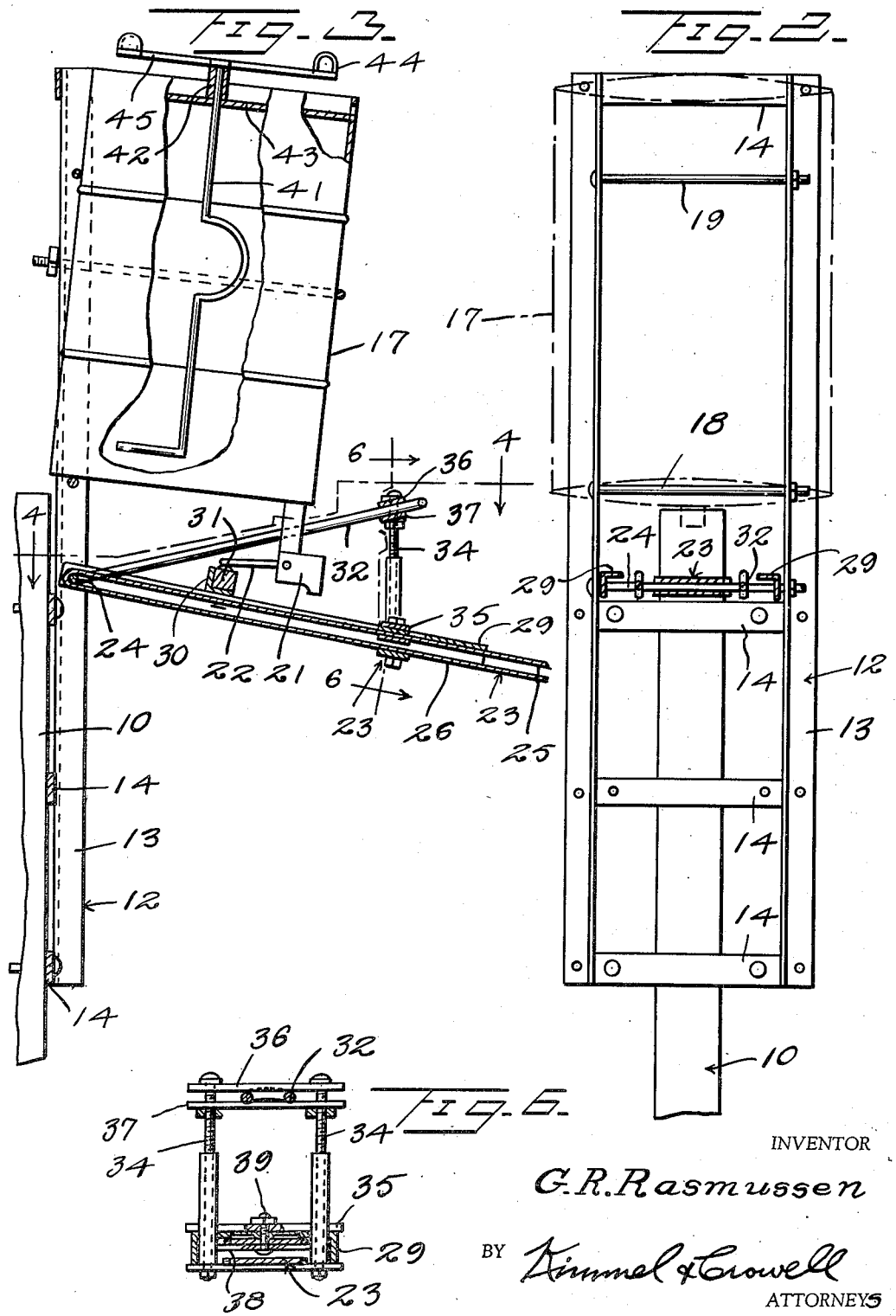
INVENTOR
G. R. Rasmussen
BY Kimmel & Crowell
ATTORNEYS Patented Feb. 23, 1954

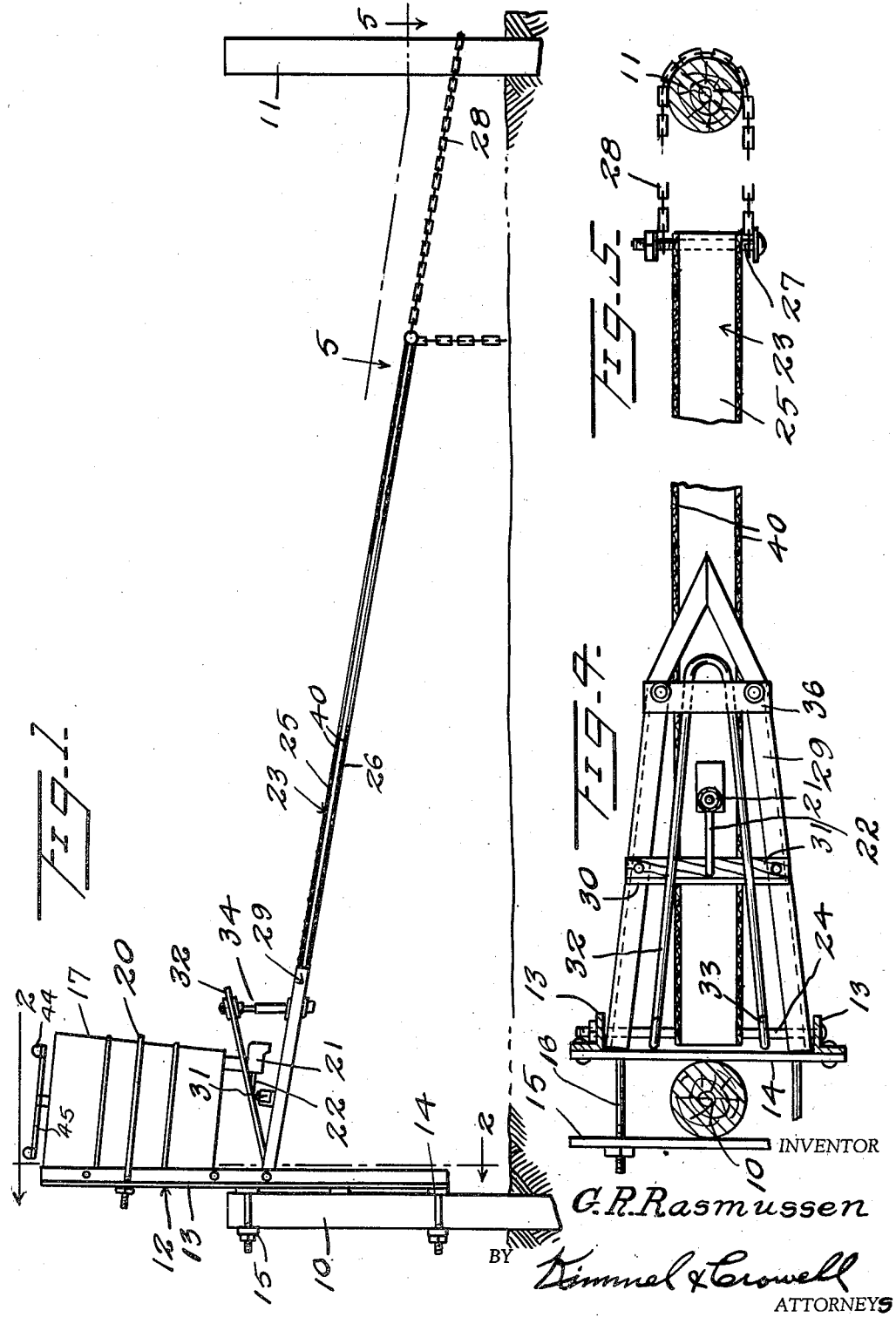

2,669,968

UNITED STATES PATENT OFFICE 2,669,968

ANIMAL OPERATED STOCK OILER

Gerald R. Rasmussen, Chappell, Nebr.

Application July 31, 1951, Serial No. 239,457

1 Claim. (Cl. 119—157)

This invention relates to a machine for oiling animals.

An object of this invention is to provide a machine which is adapted to be set up in a field or enclosure whereby animals will be oiled upon rubbing or contacting with the machine.

Another object of this invention is to provide a flexible oil distributing element disposed in a position for contact by animals, and automatically operable means for keeping the element oiled.

A further object of this invention is to provide an animal or stock oiling device which can be maintained in operating condition at small expense.

With the above and other objects in view, my invention consists in the arrangement, combination and details of construction disclosed in the drawings and specification, and then more particularly pointed out in the appended claim.

In the drawings:

Figure 1 is a detail side elevation of a stock oiling device constructed according to an embodiment of this invention, Figure 2 is an enlarged sectional view taken on the line 2—2 of Figure 1, Figure 3 is an enlarged fragmentary side elevation, partly in section, of the device, Figure 4 is a fragmentary sectional view taken on the line 4—4 of Figure 3, Figure 5 is an enlarged fragmentary sectional view taken on the line 5—5 of Figure 1, Figure 6 is a sectional view taken on the line 6—6 of Figure 3.

Referring to the drawings the numerals 10 and 11 designate generally a pair of upright posts which are spaced apart, the purpose for which will be hereinafter described. A vertically disposed frame structure generally designated as 12 is secured to the post 10 and is formed of a pair of vertically disposed angle members 13 which are connected together by means of connecting bars 14.

The frame 12 is secured to the side of the post 10 confronting the post 11, by means of clamping bars 15, and the bars 15 are secured by means of bolts 16 which extend through the frame 12 and the clamping bars 15. A liquid supply barrel 17 is secured to the upper portion of the frame 12 and the lower edge or rim of the barrel 17 is seated on a horizontally disposed bolt 18. An upper transversely disposed bolt 19 is secured between the vertical frame members 12 and the rear side of the barrel 17 is adapted to abut against the upper bolt 19 so that the barrel 17 will be disposed in an inclination to the vertical, as shown in Figure 1.

A U-shaped clamping bolt 20 engages about the barrel 17 and is secured at the rear open ends thereof to the upright frame members 13. The barrel 17 has a discharge valve 21 in the bottom thereof which is spring-pressed to a closed position, and a valve operating lever 22 projects rearwardly from the valve 21. A looped elongated fabric belt 23 is disposed below the barrel 17 and engages at one end thereof about a horizontally disposed bolt 24 secured between the upright frame members 13.

The belt 23 includes upper and lower runs 25 and 26, and the forward end of the belt 23 engages about a belt tightening bolt 27. The bolt 27 is connected with the opposite ends of a looped belt tightening chain 28 which is extended about the second post 11 at a point below the bolt 24 so that the belt 23 will be inclined downwardly and outwardly from post 10 to the post 11. The belt 23 is adapted to have oil from the barrel 17 discharge thereonto when belt 23 is rubbed by an animal, by means of a substantially V-shaped angle bar frame 29 which is rockably mounted at its divergent ends on the bolt 24. A transversely disposed angle bar 30 is fixed to the V-shaped member 29 between the forward and rear ends thereof and a block 31 is fixed to the angle bar 30 and is positioned beneath the valve operating lever 22 so that when the frame member 29 is rocked upwardly, block 31 will move lever 22 upwardly to valve opening position.

In order to provide a means whereby the frame member 29 is limited in its upward rocking, I have provided a V-shaped member 32 which is formed with eyes 33 loosely engaging about the bolt 24. The V-shaped member 32 is secured at its outer and smaller end in divergent relation with respect to the frame member 29 by means of a pair of upright bolts 34 which extend upwardly from transversely disposed belt clamping bars 35. The bolts 34 have upper and lower clamping bars 36 and 37 secured thereto which engage on the upper and lower sides of the V-shaped member 32 and hold the V-shaped member 32 in divergent relation with respect to the frame member 29, and at a point slightly below the lower rim of the barrel 17.

The upper run 25 of the belt 23 is secured to the forward portion of the frame 29 by means of the clamping bar 35, and a clamping bar 38, as shown in Figure 6. The two clamping bars 35 and 38 are clamped to the upper run 25 of the belt by means of a bolt 39. The longitudinal edges of the belt 23 have chains 40 secured thereto in order to produce an improved rubbing surface. The liquid or oil in tank 17 is kept in an agitated condition by means of an agitator 41 which is journalled through a bearing bushing 42 carried by the top wall 43 of the tank. Agitator 41 is rotated by wind through the medium of cupped blades 44 carried by radial arms 45 which are fixed to the agitator 41.

In the use and operation of this device, the barrel 17 is filled with oil and the oil is preferably of an insecticide characteristic so as to prevent insects from contacting with the animals. When an animal rubs against the belt 23, this belt will twist sideways and will also be moved upwardly as the animal rubs thereagainst so that the frame 29 will be rocked upwardly to thereby move the valve 21 to open or discharge position. In this manner each time an animal rubs against the belt 23 an additional supply of oil will be discharged onto the belt and this oil will flow downwardly toward the lower end of the belt.

I do not mean to confine myself to the exact details of construction herein disclosed, but claim all variations falling within the purview of the appended claim.

What I claim is:

A stock oiler comprising a pair of upright spaced apart posts, a vertically disposed frame fixed to one of said posts, a narrow doubled fabric belt fixed to said frame at one end, a bolt passed through the bight formed by doubling said belt, a reverted chain extending about the other of said posts and having its ends secured to the ends of said bolt holding said belt in normally horizontal position, said belt being twistable to vertical position by the rubbing of an animal thereagainst and disposed at a downward inclination from said frame, chains extending along the longitudinal edges of said belt, and means carried by said frame for discharging oil onto said belt, said means including a receptacle carried by said frame above said belt, a spring-closed valve connected to said receptacle, a second frame fixed to said belt, a valve operator carried by said second frame adapted upon upward swinging of the latter to open said valve for discharge of liquid onto said belt, and means limiting the upward swinging of said second frame.

GERALD R. RASMUSSEN.

References Cited in the file of this patent

UNITED STATES PATENTS

| Number | Name | Date |
|---|---|---|
| 1,581,544 | Pflaum | Apr. 20, 1926 |
| 1,999,122 | Clark et al. | Apr. 23, 1935 |
| 2,573,873 | Rhoades | Nov. 6, 1951 |
| 2,581,028 | Kirk | Jan. 1, 1952 |